(12) United States Patent
Kato et al.

(10) Patent No.: US 6,381,842 B2
(45) Date of Patent: May 7, 2002

(54) METHOD OF PRODUCING SWASH PLATE TYPE COMPRESSOR PISTON

(75) Inventors: Takayuki Kato; Masato Takamatsu; Takahiro Hoshida; Fuminobu Enokijima, all of Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/782,334

(22) Filed: Feb. 13, 2001

(30) Foreign Application Priority Data

Feb. 18, 2000 (JP) ........................................ 2000-041659

(51) Int. Cl.[7] ................................................. B23P 15/00
(52) U.S. Cl. ............................. 29/888.044; 29/888.04; 29/888.042; 29/888.022
(58) Field of Search ...................... 29/888.022, 888.044, 29/888.042, 888.04; 417/270; 60/492

(56) References Cited

U.S. PATENT DOCUMENTS

| 1,837,724 A | | 12/1931 | Michell |
| 4,576,554 A | * | 3/1986 | Wagenseil et al. .......... 417/270 |
| 5,423,183 A | * | 6/1995 | Folsom ........................ 60/492 |
| 6,112,642 A | * | 9/2000 | Jarrett et al. .................. 92/186 |
| 6,266,878 B1 | * | 7/2001 | Durkin et al. ......... 29/888.044 |

FOREIGN PATENT DOCUMENTS

| EP | 0 952 339 A2 | 10/1999 |
| EP | 0 952 342 A2 | 10/1999 |
| JP | A-10-159725 | 6/1998 |

* cited by examiner

*Primary Examiner*—I Cuda Rosenbaum
(74) *Attorney, Agent, or Firm*—Woodcock Washburn LLP

(57) ABSTRACT

A method of producing a hollow piston for a compressor including a head and an engaging portion for engaging a piston reciprocating drive device, at least the head portion being hollow, the method comprising the steps of: forming a cylindrical body member having an open end at at least one of its opposite ends, and a closure member closing the open end of the body member, one of the body and closure members having an annular shoulder surface and a circumferential surface which is adjacent to the shoulder surface, the shoulder and circumferential surfaces defining a female corner portion, the other member having a male corner portion corresponding to the female corner portion; and fixing the body and closure members together for engagement of the male and female corner portions, and wherein the step of forming the body and closure members comprises at least one of (a) a step of forming an annular groove at a position of one of the shoulder and circumferential surfaces of the female corner portion, the position being adjacent to the other surface, and (b) a step of forming an edge-free part in the male corner portion.

12 Claims, 9 Drawing Sheets

METHOD OF PRODUCING SWASH PLATE TYPE COMPRESSOR PISTON

This application is based on Japanese Patent Application No. 2000-041659 filed Feb. 18, 2000, the contents of which are incorporated hereinto by reference.

BACKGROUND OF THE INVENTION

1. Field of the Invention

The present invention relates in general to a method of producing a hollow piston for a compressor of reciprocating type.

2. Discussion of the Related Art

In general, a piston for a reciprocating type compressor has a head portion which is slidably fitted in a cylinder bore of the compressor, and an engaging portion which engages a reciprocating drive device of the compressor for reciprocating the piston. Upon actuation of the reciprocating drive device with the engaging portion of the piston being in engagement with the reciprocating drive device, the piston is moved such that the head portion of the piston is reciprocated in the cylinder bore to effect suction and compression of a gas. A swash plate type compressor is one example of the compressor which uses such a piston. In the piston used for the swash plate type compressor, the engaging portion is generally U-shaped, and engages the opposite surfaces of the swash plate of the compressor through a pair of shoes. The piston is reciprocated by a rotary movement of the swash plate.

For reducing the weight of the piston for the compressor, at least the head portion of the piston is made hollow. As disclosed in JP-A-11-303747 and JP-A-11-294320, such a piston is produced by preparing a hollow cylindrical member having an open end at at least one of its opposite ends, and a closure member, and closing the open end of the hollow cylindrical member with the closure member. According to the methods disclosed in those publications, a hollow head portion of the piston is formed by closing, with the closure member, an open end of a body member of a blank for manufacturing the piston, which body member of the blank includes a bottom portion and a hollow cylindrical portion. When the body member of the blank is formed integrally with the engaging portion, the closure member is a circular plate member, or a cylindrical member including a circular bottom plate portion and a cylindrical portion. When the body member of the blank is separate from the engaging portion, the closure member is formed integrally with the engaging portion.

Where the head portion of the piston is formed by closing the open end of the hollow cylindrical member with the closure member, it is generally known that one of the hollow cylindrical member and the closure member is formed to have a female corner portion which is defined by an annular shoulder surface and a circumferential surface adjacent to the shoulder surface, while the other of the hollow cylindrical member and the closure member is formed to have a male corner portion which corresponds to the female corner portion. If the closure member includes an annular abutting surface which is to be held in abutting contact with an end face of the hollow cylindrical member at its open end, and a radially inner fitting portion which protrudes axially from the annular abutting surface and which is to be inserted into the open end of the hollow cylindrical member, for instance, the annular abutting surface of the closure member functioning as the shoulder surface cooperates with an outer circumferential surface of the fitting portion to define the female corner portion, while the open end portion of the hollow cylindrical member defines the male corner portion. If the open end portion of the hollow cylindrical member includes a large-diameter portion and a small-diameter portion, and the closure member is inserted into the large-diameter portion of the hollow cylindrical member, an annular surface which connects the large-diameter and small-diameter portions functions as the shoulder surface, and cooperates with an inner circumferential surface of the large-diameter portion to define the female corner portion. In this case, the male corner portion is defined by an end face of the closure member which is to be held in abutting contact with the shoulder surface of the cylindrical member, and an outer circumferential surface of the closure member adjacent to the end face.

The hollow cylindrical member and the closure member are fixed to each other generally by welding, bonding, friction compression, caulking, etc., with the male corner portion being held in abutting contact with the shoulder surface of the female corner portion. The female corner portion, however, is usually rounded to provide a fillet at a boundary between the shoulder surface and the circumferential surface, for easier manufacture of the hollow cylindrical member or the closure member by casting, forging, or cutting, so that the fillet of the female corner portion interferes with the edge of the male corner portion upon engagement of the hollow cylindrical member and the closure member with each other. In this case, there is formed a gap between the shoulder surface of the female corner portion and the abutting surface of the male corner portion, which must be held in abutting contact with the shoulder surface. Since this gap is negligibly small in general, the fixing of the two members is conventionally effected without taking the gap into account. It has turned out, however, that the gap undesirably gives adverse influences on the performance of the piston.

Described in detail, when the hollow cylindrical member and the closure member are fixed to each other by beam-welding the shoulder surface of the female corner portion and the abutting surface of the male corner portion (i.e., the welding surfaces at which the two members are welded together), materials of welded portions of the two members are excessively fused to fill up the gap. In this case, the welded portions of the two members may be recessed due to the excessive fusion of the materials of the two members. In an extreme case, there may be formed a hole in the welded surfaces of the two members, undesirably lowering the weld strength of the two members at the welding surfaces. When the hollow cylindrical member and the closure member are fixed to each other by bonding with an adhesive agent, the thickness of the layer of the adhesive agent formed between the shoulder surface and the abutting surface tends to be larger than a predetermined nominal or optimum thickness value, resulting in reduction of the bonding strength of the two members at the bonding surfaces. When the hollow cylindrical member and the closure member are fixed to each other by pressure welding, the edge of the male corner portion is forced against the fillet of the female corner portion, and collapses so as to substantially follow the fillet, so that the gap between the shoulder surface and the abutting surface is less likely to give adverse influences on the strength of fixing of the two members. Where the fillet of the female corner portion is relatively large, however, the two members may not be fixed together with a sufficient strength. Where the two members are fixed to each other by caulking, the edge of the male corner portion is repeatedly pressed onto the fillet of the female corner portion during operation of the piston, undesirably causing plastic deformation of the edge and the fillet. In this case, the hollow cylindrical member and the closure member which are caulked together may suffer from a rattling movement relative to each other, rendering the piston inoperable.

SUMMARY OF THE INVENTION

It is an object of the present invention to provide a method of producing a hollow piston used for a compressor, which has a sufficiently high degree of durability.

The object indicated above may be achieved according to any one of the following forms or modes of the present invention, each of which is numbered like the appended claims and depend from the other form or forms, where appropriate, to indicate and clarify possible combinations of technical features of the present invention, for easier understanding of the invention. It is to be understood that the present invention is not limited to the technical features and their combinations described below. It is also to be understood that any technical feature described below in combination with other technical features may be a subject matter of the present invention, independently of those other technical features.

(1) A method of producing a hollow piston for a compressor including a head portion which is slidably fitted in a cylinder bore of the compressor, and an engaging portion which engages a reciprocating drive device of the compressor which reciprocates the piston, at least the head portion of the piston being hollow, the method comprising the steps of: forming a hollow cylindrical body member which has an open end at at least one of opposite ends thereof, and a closure member which closes the open end of the cylindrical body member, one of the cylindrical body member and the closure member having an annular shoulder surface and a circumferential surface which is adjacent to the annular shoulder surface, the annular shoulder surface and the circumferential surface cooperating with each other to define a female corner portion, the other of the cylindrical body member and the closure member having a male corner portion which corresponds to the female corner portion; and fixing the cylindrical body member and the closure member to each other, so that the male corner portion engages the female corner portion, and wherein the step of forming the cylindrical body member and the closure member comprises at least one of (a) a step of forming an annular groove at a position of one of the annular shoulder surface and the circumferential surface of the female corner portion, the position being adjacent to the other of the annular shoulder surface and the circumferential surface, and (b) a step of forming an edge-free part in the male corner portion.

The piston produced according to the method according to the above mode (1) of this invention has the annular groove which is formed at a position of one of the shoulder surface and the circumferential surface which cooperate to define the female corner portion, the position being adjacent to the other of the shoulder surface and the circumferential surface, and/or the edge-free part such as a chamfer or a round which is formed in the male corner portion. Even if a fillet is present at the boundary between the shoulder surface and the circumferential surface of the female corner portion, it is possible to prevent a conventionally experienced interference between the fillet of the female corner portion and the edge of the male corner portion, by providing the male corner portion with an edge-free part according to the present invention. Accordingly, the piston produced according to the present method is free from the gap conventionally formed between the shoulder surface of the female corner portion and the abutting surface of the male corner portion to be held in abutting contact with the shoulder surface. Therefore, the piston produced by the method of the present invention does not suffer from adverse influences of the above-indicated gap, such as the recess or hole formed in the welded portions due to the excessive fusion of the material, the excessively thick adhesive layer, the insufficient friction compression, and the lowered stability of the caulking portion which results from the caulking of the cylindrical body member and the closure member such that the fillet of the female corner portion and the edge of the male corner portion interfere with each other. Thus, the piston produced according to the present method assures excellent durability while avoiding reduction of the strength of bonding of the closure member to the cylindrical member. The formation of the edge-free part in the male corner portion inevitably reduces an area of contact of the abutting surface of the male corner portion with the shoulder surface of the female corner portion. Accordingly, the cylindrical body member and the closure member are bonded to each other with a higher degree of bonding strength therebetween in an arrangement wherein the annular groove is formed in the female corner portion than in an arrangement wherein the edge-free part is formed in the male corner portion, especially where the closure member is fixed to the cylindrical body member by welding together the shoulder surface of the female corner portion and the abutting surface of the male corner portion, which is to be held in abutting contact with the shoulder surface.

(2) A method according to the above mode (1), wherein the circumferential surface partially defining the female corner portion is an inner circumferential surface.

In the piston produced according to the above mode (2), the hollow cylindrical body member includes, at its open end which is to be closed by the closure member, a large-diameter portion, a small-diameter portion, and a shoulder surface formed therebetween. In this piston, the hollow cylindrical body member has the female corner portion which is defined by the inner circumferential surface of the large-diameter portion and the shoulder surface. Where the closure member is a cylindrical member having an open end and a closed end, the closure member may be fixed to a hollow cylindrical body member having a radially inner annular fitting portion formed at an open end thereof, such that the fitting portion of the hollow cylindrical body member is fitted in a cylindrical portion of the closure member. In this case, the closure member has the female corner portion which is partially defined by an inner circumferential surface of the cylindrical portion.

(3) A method according to the above mode (1), wherein the circumferential surface partially defining the female corner portion is an outer circumferential surface.

In the piston produced according to the above mode (3), the closure member includes a radially inner annular fitting portion which is to be fitted in the open end portion of the hollow cylindrical body member. Where the closure member is a cylindrical member having an open end and a closed end, the closure member may be fixed to a hollow cylindrical body member having a radially inner annular fitting portion which is formed at its open end and which has an outside diameter smaller than that of the other portion, so that a shoulder surface is defined between the annular fitting portion and the other portion. In this case, the hollow cylindrical body member has the female corner portion which is defined by the shoulder surface and the outer circumferential surface of the annular fitting portion.

(4) A method according to any one of the above modes (1)–(3), wherein the hollow cylindrical body member includes a bottom portion and a hollow head portion, the engaging portion being formed integrally with the bottom portion of the hollow cylindrical body member.

In the piston produced according to the above mode (4), the closure member can be constituted by a simple circular plate member. Accordingly, the piston receives a reduced force at a point of fixing or bonding of the closure member and the hollow cylindrical body member to each other, whereby the piston having excellent durability can be easily formed, or the present arrangement permits reduction in a distance of engagement between the closure member and the hollow cylindrical body member, so that the weight of the piston can be reduced.

(5) A method according to the above mode (4), wherein the closure member is a generally circular plate member.

(6) A method according to the above mode (4), wherein the closure member includes a circular bottom plate portion and a cylindrical portion, the closure member, which is fixed to the cylindrical body member functioning as a first cylindrical portion of the piston, functioning as a second cylindrical portion of the piston, the first cylindrical portion and the second cylindrical portion being fixed together at their distal ends.

(7) A method according to any one of the above modes (1)–(3), wherein the cylindrical body member includes a bottom portion and a hollow head portion, while the closure member includes a generally circular closure portion and the engaging portion which is formed integrally with the circular closure portion.

The present arrangement permits easy forming of the hollow cylindrical body member and the closure member by forging.

(8) A method according to any one of the above modes (1)–(7), wherein the step of fixing the cylindrical body member and the closure member to each other comprises a step of beam-welding at least one of the annular shoulder surface and the circumferential surface of the female corner portion, to a surface of the male corner portion, which surface corresponds to the at least one of the annular shoulder surface and the circumferential surface.

(9) A method according to any one of the above modes (1)–(7), wherein the step of fixing the cylindrical body member and the closure member to each other comprises a step of bonding, by using an adhesive agent, at least one of the annular shoulder surface and the circumferential surface of the female corner portion to a surface of the male corner portion, which surface corresponds to the at least one of the annular shoulder surface and the circumferential surface.

(10) A method according to any one of the above modes (1)–(7) and (9), wherein the circumferential surface partially defining the female corner portion is an inner circumferential surface, and wherein the step of fixing the cylindrical body member and the closure member to each other comprises a step of caulking radially inwardly a cylindrical wall which has the inner circumferential surface of the female corner portion.

(11) A method of producing a hollow piston for a compressor including a head portion which is slidably fitted in a cylinder bore of the compressor, and an engaging portion which engages a reciprocating drive device of the compressor which reciprocates the piston, at least the head portion of the piston being hollow, the method comprising the steps of: forming a cylindrical body member which has an open end at at least one of opposite ends thereof, and a closure member which has an annular abutting surface that is to be held in abutting contact with an end face of the cylindrical body member on the side of the open end thereof, and an annular protruding fitting portion which axially protrudes from the annular abutting surface and which is inserted into the open end of the cylindrical body member; and fixing the closure member to the cylindrical body member such that the annular protruding fitting portion of the closure member being inserted into the open end of the cylindrical member, and such that the annular abutting surface of the closure member is held in abutting contact with the end face of the cylindrical body member, and wherein the step of forming the cylindrical body member and the closure member comprises at least one of (a) a step of forming an edge-free part at a radially inner end of the end face of the cylindrical body member, and (b) a step of forming an annular groove at a position of one of an outer circumferential surface and the annular abutting surface of the closure member, the position being adjacent to the other of the outer circumferential surface and the annular abutting surface.

(12) A method of producing a hollow piston for a compressor including a head portion which is slidably fitted in a cylinder bore of the compressor, and an engaging portion which engages a reciprocating drive device of the compressor which reciprocates the piston, at least the head portion of the piston being hollow, the method comprising the steps of: forming a cylindrical body member which has an open end at at least one of opposite ends thereof and which includes a large-diameter portion on the side of the open end, a small-diameter portion remote from the open end, and a shoulder surface between the large-diameter and small-diameter portions, and a closure member which has an annular abutting surface that is to be held in abutting contact with the shoulder surface; and fixing the closure member to the cylindrical body member such that the closure member is inserted into the large-diameter portion of the cylindrical body member with the annular abutting surface of the closure member being held in abutting contact with the shoulder surface of the cylindrical body member, and wherein the step of forming the cylindrical body member and the closure member comprises at least one of (a) a step of forming an annular groove at a position of one of an inner circumferential surface and the shoulder surface, the position being adjacent to the other of the inner circumferential surface and the shoulder surface, and (b) a step of forming an edge-free part at a radially outer end of the annular abutting surface of the closure member.

BRIEF DESCRIPTION OF THE DRAWINGS

The above and optional objects, features, advantages and technical and industrial significance of the present invention will be better understood and appreciated by reading the following detailed description of presently preferred embodiments of the invention, when considered in connection with the accompanying drawings, in which.

DETAILED DESCRIPTION OF THE PREFERRED EMBODIMENTS

Referring to the accompanying drawings, there will be described presently preferred embodiments of the present invention as applied to a single-headed piston for a swash plate type compressor used for an air conditioning system of an automotive vehicle.

Figure 1:
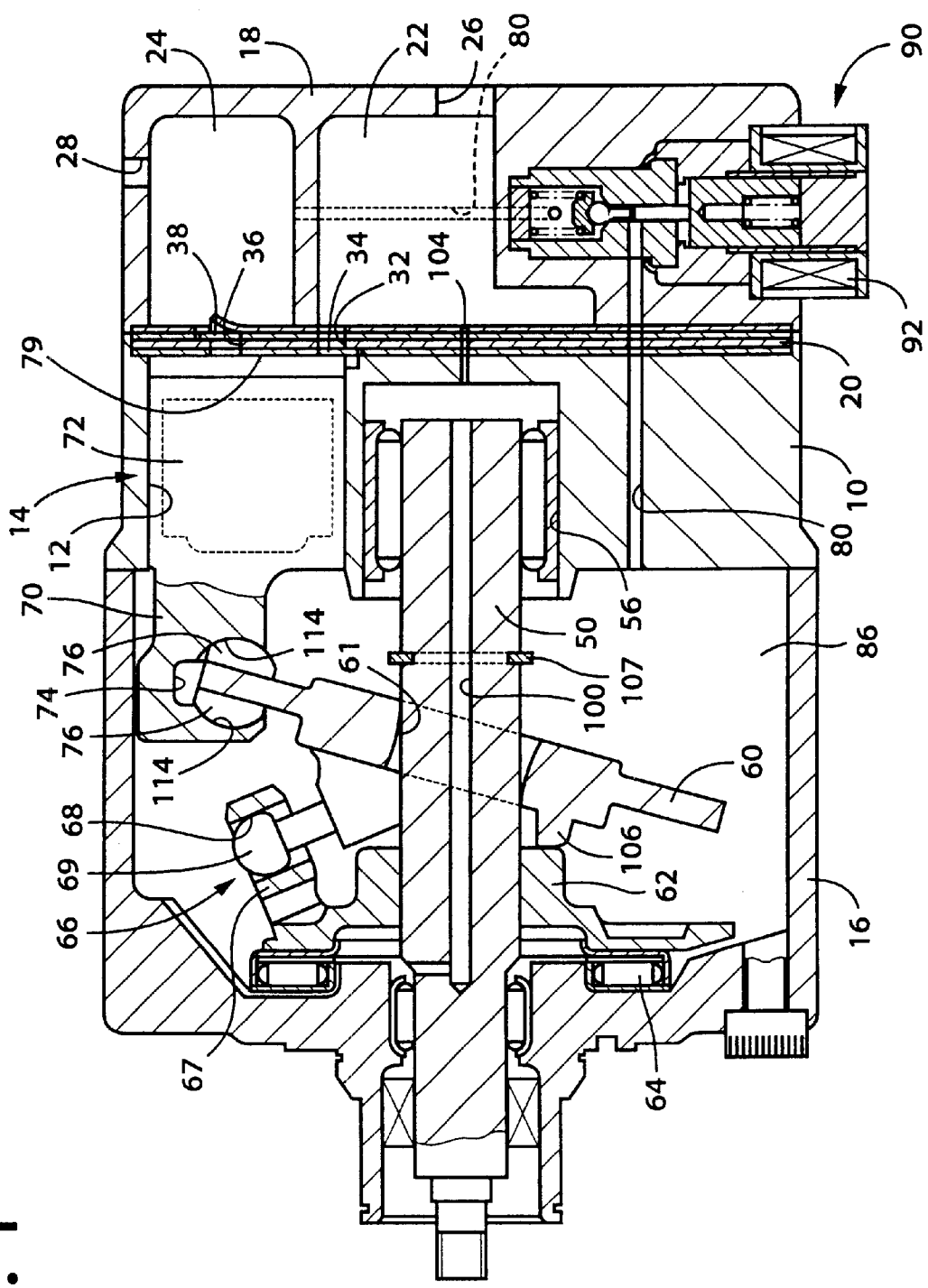
FIG. 1 is a front elevational view in cross section of a swash plate type compressor equipped with a piston produced according to a first embodiment of the present invention.

Referring first to FIG. 1, there is shown a compressor of swash plate type incorporating a plurality of single-headed pistons (hereinafter referred to simply as "pistons") each constructed according to one embodiment of the present invention.

In FIG. 1, reference numeral 10 denotes a cylinder block having a plurality of cylinder bores 12 formed so as to extend in its axial direction such that the cylinder bores 12 are arranged along a circle whose center lies on a centerline of the cylinder block 10. The piston generally indicated at 14 is reciprocably received in each of the cylinder bores 12. To one of the axially opposite end faces of the cylinder block 10, (the left end face as seen in FIG. 1, which will be referred to as "front end face"), there is attached a front housing 16. To the other end face (the right end face as seen in FIG. 1, which will be referred to as "rear end face"), there is attached a rear housing 18 through a valve plate 20. The front housing 16, rear housing 18 and cylinder block 10 cooperate to constitute a housing assembly of the swash plate type compressor. The rear housing 18 and the valve plate 20 cooperate to define a suction chamber 22 and a discharge chamber 24, which are connected to a refrigerating circuit (not shown) through an inlet 26 and an outlet 28, respectively. The valve plate 20 has suction ports 32, suction valves 34, discharge ports 36 and discharge valves 38.

A rotary drive shaft 50 is disposed in the cylinder block 10 and the front housing 16 such that the axis of rotation of the drive shaft 50 is aligned with the centerline of the cylinder block 10. The drive shaft 50 is supported at its opposite end portions by the front housing 16 and the cylinder block 10, respectively, via respective bearings. The cylinder block 10 has a central bearing hole 56 formed in a central portion thereof, and the bearing is disposed in this central bearing hole 56, for supporting the drive shaft 50 at its rear end portion. The front end portion of the drive shaft 50 is connected, through a clutch mechanism such as an electromagnetic clutch, to an external drive source (not shown) in the form of an engine of an automotive vehicle. In operation of the compressor, the drive shaft 50 is connected through the clutch mechanism to the vehicle engine in operation so that the drive shaft 50 is rotated about its axis.

The rotary drive shaft 50 carries a swash plate 60 such that the swash plate 60 is axially movable and tiltable relative to the drive shaft 50. The swash plate 60 has a central hole 61 through which the drive shaft 50 extends. The diameter of the central hole 61 of the swash plate 60 gradually increases in the axially opposite directions from its axially intermediate portion towards the axially opposite ends. To the drive shaft 50, there is fixed a rotary member 62 as a torque transmitting member, which is held in engagement with the front housing 16 through a thrust bearing 64. The swash plate 60 is rotated with the drive shaft 50 by a hinge mechanism 66 during rotation of the drive shaft 50. The hinge mechanism 66 guides the swash plate 60 for its axial and tilting motions. The hinge mechanism 66 includes a pair of support arms 67 fixed to the rotary member 62, guide pins 69 which are formed on the swash plate 60 and which slidably engage guide holes 68 formed in the support arms 67, the central hole 61 of the swash plate 60, and the outer circumferential surface of the drive shaft 50. It is noted that the swash plate 60, the rotary drive shaft 50, and the torque transmitting device in the form of the hinge mechanism 66 cooperate with one another to constitute a reciprocating drive device for reciprocating the pistons 14.

The piston 14 indicated above includes an engaging portion 70 engaging the swash plate 60, and a head portion 72 formed integrally with the engaging portion 70 and fitted in the corresponding cylinder bore 12. The engaging portion 70 has a groove 74 formed therein, and the swash plate 60 is held in engagement with the groove 74 through a pair of hemispherical shoes 76. The hemispherical shoes 76 are held in the groove 74 such that the shoes 76 slidably engage the engaging portion 70 at their hemi-spherical surfaces and such that the shoes 76 slidably engage the radially outer portions of the opposite surfaces of the swash plate 60 at their flat surfaces. The configuration of the piston 14 will be described in detail.

A rotary motion of the swash plate 60 is converted into a reciprocating linear motion of the piston 14 through the shoes 76. A refrigerant gas in the suction chamber 22 is sucked into the pressurizing chamber 79 through the suction port 32 and the suction valve 34 when the piston 14 is moved from its upper dead point to its lower dead point, that is, when the piston 14 is in the suction stroke. The refrigerant gas in the pressurizing chamber 79 is pressurized by the piston 14 when the piston 14 is moved from its lower dead point to its upper dead point, that is, when the piston 14 is in the compression stroke. The pressurized refrigerant gas is discharged into the discharge chamber 24 through the discharge port 36 and the discharge valve 38. A reaction force acts on the piston 14 in the axial direction as a result of compression of the refrigerant gas in the pressurizing chamber 79. This compression reaction force is received by the front housing 16 through the piston 14, swash plate 60, rotary member 62 and thrust bearing 64.

The engaging portion 70 of the piston 14 has an integrally formed rotation preventive part (not shown), which is arranged to contact the inner circumferential surface of the front housing 16, for thereby preventing a rotary motion of the piston 14 about its centerline to prevent an interference between the piston 14 and the swash plate 60.

The cylinder block 10 has a supply passage 80 formed therethrough for communication between the discharge chamber 24 and a crank chamber 86 which is defined between the front housing 16 and the cylinder block 10. The supply passage 80 is connected to a capacity control valve 90 provided to control the pressure in the crank chamber 86. The capacity control valve 90 is a solenoid-operated valve having a solenoid coil 92 which is selectively energized and de-energized by a control device (not shown) constituted principally by a computer. During energization of the solenoid coil 92, the amount of electric current applied to the solenoid coil 92 is controlled depending upon the air conditioner load, so that the amount of opening of the capacity control valve 90 is controlled according to the air conditioner load.

The rotary drive shaft 50 has a bleeding passage 100 formed therethrough. The bleeding passage 100 is open at one of its opposite ends to the central bearing hole 56, and is open to the crank chamber 86 at the other end. The central bearing hole 56 communicates at its bottom with the suction chamber 22 through a communication port 104.

The present swash plate type compressor is of variable capacity type. By controlling the pressure in the crank chamber 86 by utilizing a difference between the pressure in the discharge chamber 24 as a high-pressure source and the pressure in the suction chamber 22 as a low pressure source, a difference between the pressure in the crank chamber 86 which acts on the front side of the piston 14 and the pressure in the pressurizing chamber 79 is regulated to change the angle of inclination of the swash plate 60 with respect to a plane perpendicular to the axis of rotation of the drive shaft 50, for thereby changing the reciprocating stroke (suction and compression strokes) of the piston 14, whereby the discharge capacity of the compressor can be adjusted.

Described in detail, the pressure in the crank chamber 86 is controlled by controlling the capacity control valve 90 to selectively connect and disconnect the crank chamber 86 to and from the discharge chamber 24. Described more specifically, while the solenoid coil 92 is in the de-energized state, the capacity control valve 90 is held in its fully open state, and the supply passage 80 is opened for permitting the pressurized refrigerant gas to be delivered from the discharge chamber 24 into the crank chamber 86, resulting in an increase in the pressure in the crank chamber 86, and the angle of inclination of the swash plate 60 is minimized. The reciprocating stroke of the piston 14 which is reciprocated by rotation of the swash plate 60 decreases with a decrease of the angle of inclination of the swash plate 60, so as to reduce an amount of change of the volume of the pressurizing chamber 79, whereby the discharge capacity of the compressor is minimized. While the solenoid coil 92 is in the energized state, the amount of the pressurized refrigerant gas in the discharge chamber 24 to be delivered into the crank chamber 86 is reduced, by increasing an amount of electric current applied to the solenoid coil 92 to reduce (or zero) the amount of opening of the capacity control valve 90. In this condition, the refrigerant gas in the crank chamber 86 flows into the suction chamber 22 through the bleeding passage 100 and the communication port 104, so that the pressure in the crank chamber 86 is lowered, to thereby increase the angle of inclination of the swash plate 60. Accordingly, the amount of change of the volume of the pressurizing chamber 79 is increased, whereby the discharge capacity of the compressor is increased. When the supply passage 80 is closed upon energization of the solenoid coil 92, the pressurized refrigerant gas in the discharge chamber 24 is not delivered into the crank chamber 86, whereby the angle of inclination of the swash plate 60 is maximized to maximize the discharge capacity of the compressor.

The maximum angle of inclination of the swash plate 60 is limited by abutting contact of a stop 106 formed on the swash plate 60, with the rotary member 62, while the minimum angle of inclination of the swash plate 60 is limited by abutting contact of the swash plate 60 with a stop 107 in the form of a ring fixedly fitted on the drive shaft 50. In the present embodiment, the supply passage 80, the crank chamber 86, the capacity control valve 90, the bleeding passage 100, the communication port 104, and the control device for controlling the capacity control valve 90 cooperate to constitute a major portion of an angle adjusting device for controlling the angle of inclination of the swash plate 60 depending upon the pressure in the crank chamber 86 (a discharge capacity adjusting device for adjusting the discharge capacity of the compressor).

The cylinder block 10 and each piston 14 are formed of an aluminum alloy. The piston 14 is coated at its outer circumferential surface with a fluoro resin film which prevents a direct contact of the aluminum alloy of the piston 14 with the aluminum alloy of the cylinder block 10 so as to prevent seizure therebetween, and makes it possible to minimize the amount of clearance between the piston 14 and the cylinder bore 12. The cylinder block 10 and the piston 14 may also be formed of an aluminum silicon alloy. Other materials may be used for the cylinder block 10, the piston 14, and the coating film.

There will next be described the configuration of the piston 14.

Figure 2:
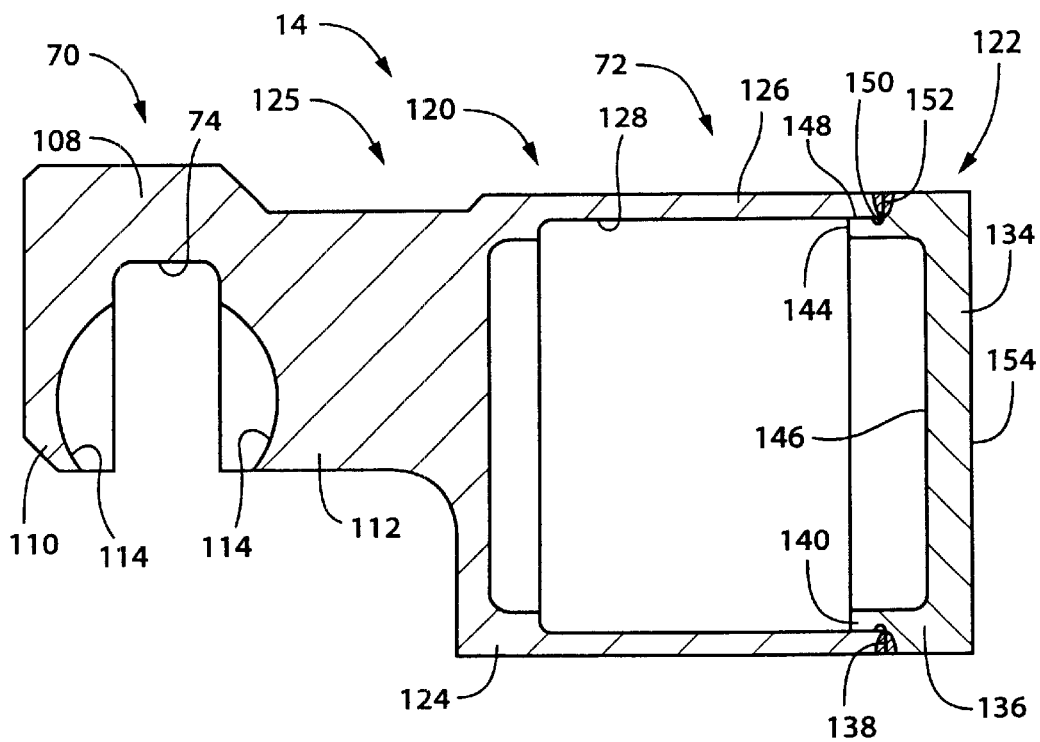
FIG. 2 is a front elevational view in cross section of the piston shown in FIG. 1.

The end portion of the engaging portion 70 of the piston 14, which is remote from the head portion 72, has a U-shape in cross section, as shown in FIG. 2. Described in detail, the engaging portion 70 has a base section 108 which defines the bottom of the U-shape, and a pair of substantially parallel arm sections 110, 112 which extend from the base section 108 in a direction perpendicular to the axis of the piston 14. The two opposed lateral walls of the U-shape of the engaging portion 70 have respective recesses 114 which are opposed to each other. Each of these recesses 114 is defined by a part-spherical inner surface of the lateral wall. The pair of shoes 76 indicated above are held in contact with the opposite surfaces of the swash plate 60 at its radially outer portion and are received in the respective part-spherical recesses 114. Thus, the engaging portion 70 slidably engages the swash plate 60 through the shoes 76.

The head portion 72 of the piston 14 is formed integrally with the engaging portion 70 on the side of its arm section 112, and includes a cylindrical body member 120 which is open at one of its opposite ends on the side remote from the arm section 112 of the engaging portion 70, and an end section in the form of a cap 122 functioning as a closure member fixed to the cylindrical body member portion 120 for closing the open end of the body member 120. The cylindrical body member 120 and the engaging portion 70 constitute a body 125 of the piston. The body member 120 includes a hollow head portion 126 which extends from a radially outer portion of a bottom portion 124 thereof in the axial direction of the body member 120. The body member 120 has an inner circumferential surface 128 whose diameter is constant over the entire axial length thereof.

Figure 3:
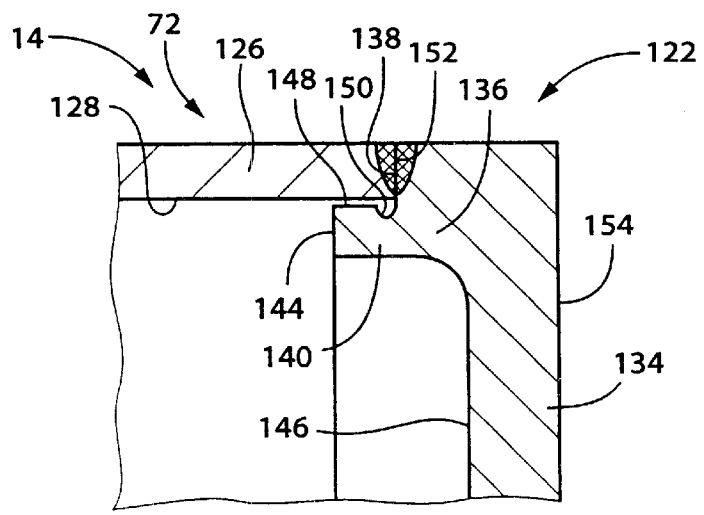
FIG. 3 is a fragmentary enlarged front elevational view in cross section of the piston of FIG. 2.

The cap 122 has a circular bottom plate portion 134, a hollow cylindrical large-diameter portion 136 extending from a radially outer portion of the bottom plate portion 134 in the axial direction of the cap 122, and a hollow cylindrical small-diameter portion 140 extending from a radially inner portion of an end face 138 of the large-diameter portion 136. The cap 122 has a recess 146 which is defined by inner circumferential surfaces of the small- and large-diameter portions 136, 140 and an inner surface of the bottom plate portion 134, and which is open in an end face 144 of the small-diameter portion 140, so that the weight of the cap 122 is reduced. As shown in FIG. 2, there is formed a fillet at a boundary between the inner circumferential surface of the large-diameter portion 136 and the inner surface of the bottom plate portion 134 (i.e., bottom surface of the recess 146), for thereby enhancing the rigidity at the boundary. For easier understanding, the thickness of the cylindrical wall of the hollow head portion 126, the thickness of the cylindrical wall of the large-diameter portion 136 of the cap 122, and the thickness of the bottom plate portion 134 of the cap 122 are exaggerated in FIG. 2. As shown in FIG. 3, an annular groove 150 is formed at a position of an outer circumferential surface 148 of the small-diameter portion 140, which position is adjacent to the end face 138 of the large-diameter portion 136.

The cap 122 is fixed to the cylindrical body member 120 such that the outer circumferential surface 148 of the small-diameter portion 140 of the cap 122 engages the inner circumferential surface 128 of the cylindrical body member 120, and such that the end face 138 of the large-diameter portion 136 of the cap 122 engages an annular end face 152 of the cylindrical body member 120, so that the end face 152 of the cylindrical body member 120 and the end face 138 of the large-diameter portion 138 of the cap 122 are welded together. In FIG. 3, a clearance between the inner circumferential surface 128 of the cylindrical body member 120 and the outer circumferential surface 148 of the small-diameter portion 140 of the cap 122 is exaggerated. The compression reaction force which acts on an end face 154 of the piston 14 as a result of compression of the refrigerant gas in the pressurizing chamber 79 during the compression stroke of the piston 14 is received by the end face 138 of the large-diameter portion 136 of the cap 122 and the end face 152 of the cylindrical body member 120, which end faces are bonded by welding.

Figure 4:
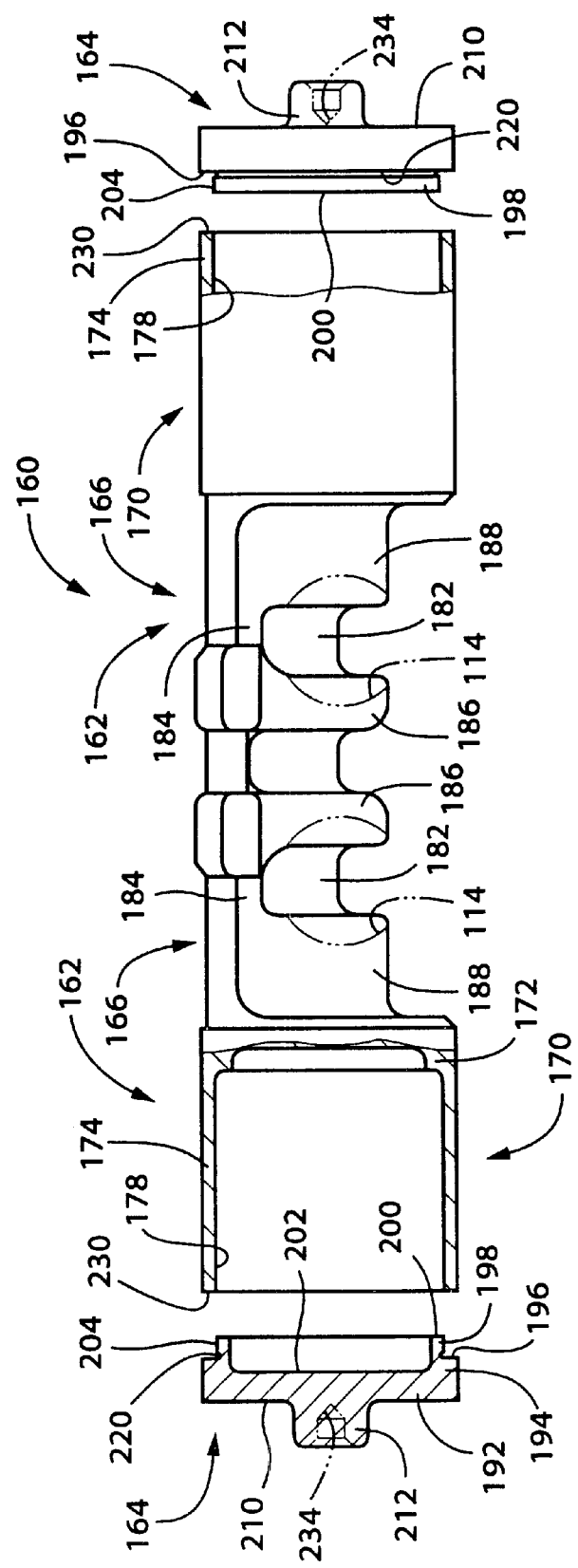
FIG. 4 is a front elevational view partly in cross section showing a blank used for manufacturing the piston of FIG. 2, before a closing member is fixed to each body member of the blank.

Two pieces of the piston 14 produced as described above are produced from a single blank 160 shown in FIG. 4. The blank 160 used for producing the two pistons 14 has two body members 162 and two closing members 164. Each body member 162 consists of an engaging section 166 and a hollow cylindrical body section 170 which is formed integrally with the engaging section 166 and which is closed at one of its opposite ends that is on the side of the engaging section 166, and is open at the other end. The two body members 162 are connected to each other at their ends on the side of the engaging sections 166 such that the two cylindrical body sections 170 are concentric with each other.

The hollow cylindrical body section 170 of each body member 162 has a bottom section 172, and a cylindrical hollow head section 174 which extends from a radially outer portion of the bottom section 172 in the axial direction of the body member 162. The hollow cylindrical body section 170 is formed integrally with the engaging section 166 at the bottom section 172. The hollow head section 174 has an inner circumferential surface 178 whose diameter is constant over the entire axial length thereof, and which provides the inner circumferential surface 128 of the piston 14. The engaging section 166 of each body member 162 includes a base section 184 functioning as the base portion 108 of the piston 14 and a pair of opposed parallel arm sections 186, 188 functioning as the arm sections 110, 112 of the piston 14. Reference numeral 182 denotes two bridge portions, each of which connects the inner surfaces of the arm sections 186, 188, in order to reinforce the engaging section 166 for increasing the rigidity of the body member 162, for improved accuracy of a machining operation on the blank 160, which is effected while the blank 160 is held at its opposite ends by chucks as described later, and for preventing the body member 162 from being deformed due to heat. In the present embodiment, the body members 162 are formed by casting or forging of a metallic material in the form of an aluminum alloy. For instance, the body members 162 are formed by die-casting with a sand mold or a metal mold, vacuum casting, pore-free (PF) die-casting, rheo-casting, or a forging cast process. Alternatively, the body members 162 are formed by ordinary forging, or semi-solid forging (SSF).

The two closing members 164 are identical in construction with each other as shown in FIG. 4. Like the cap 122 of the piston 14 described above, each closing member 164 includes a circular bottom plate section 192, a hollow cylindrical large-diameter section 194 which extends from a radially outer portion of the bottom plate section 192 in the axial direction of the closing member 164, and a hollow cylindrical small-diameter section 198 which extends from a radially inner portion of an end face 196 of the large-diameter section 194 in the axial direction. The closing member 164 has a recess 202 which is defined by inner circumferential surfaces of the small- and large-diameter sections 198, 194 and an inner surface of the bottom plate section 192, and which is open in an end face 200 of the small-diameter section 198, so that the weight of the closing member 164 is reduced. The recess 202 of the closing member 164 provides the recess 146 of the piston 14. The small-diameter section 198 of the closing member 164 has an outer circumferential surface 204 whose diameter is smaller than that of the large-diameter section 194, so that the small-diameter section 198 of the closing member 164 is inserted into the cylindrical body section 170 such that the outer circumferential surface 204 of the small-diameter section 198 of the closing member 164 engages the inner circumferential surface 178 of the cylindrical body section 170. The circular bottom plate section 192 of each closing member 164 has a holding portion 212 formed at a central portion of its outer end face 210 which is remote from the end face 200 of the small-diameter section 198. The holding portion 212 has a circular shape in cross section, and has a center hole 234. Like the body member 162, the closing member 164 in the present embodiment is formed by casting or forging of a metallic material in the form of an aluminum alloy.

Figure 5A:
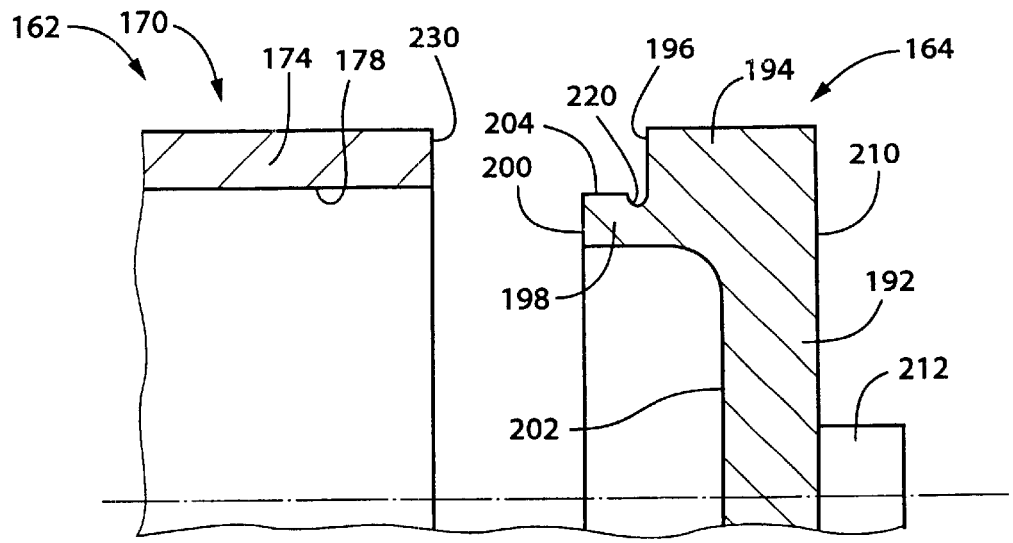
FIGS. 5A and 5B are front elevational views in cross section explaining a method of producing the piston of FIG. 2.

As shown in FIG. 5A, there is formed an annular groove 220 at a position of the outer circumferential surface 204 of the small-diameter section 198 of the closing member 164, which position is adjacent to the end face 196 of the large-diameter section 194. The annular groove 220 provides the annular groove 150 of the piston 14. The annular groove 220 is formed by a cutting operation using a cutting tool not shown after the closing member 164 has been produced by casting or forging. In FIG. 5A, the cylindrical wall thickness of the hollow head section 174, the cylindrical wall thickness of the large-diameter section 194, and the wall thickness of the bottom plate section 192 are exaggerated for easier understanding.

There will be next explained a process of fixing the closing member 164 to the body member 162.

Figure 5B:
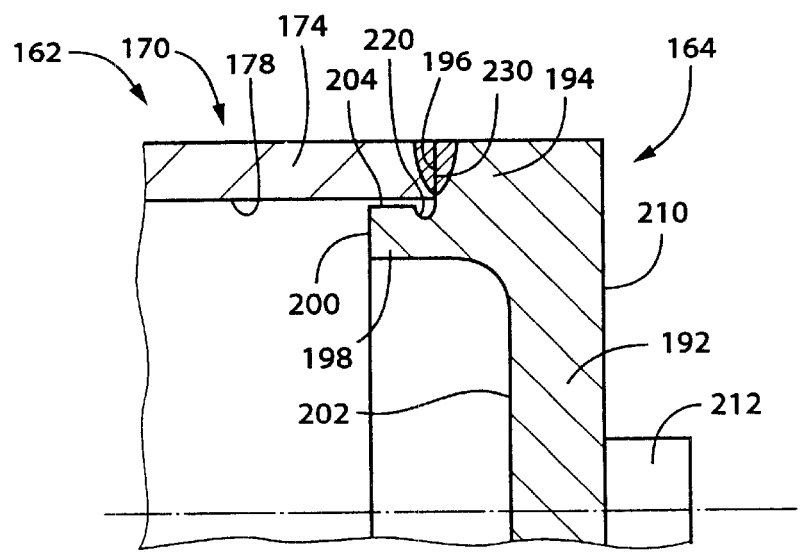

As shown in FIG. 5A, the small-diameter section 198 of the closing member 164 is inserted into the open end of the body section 170 with axes of the closing member 164 and the body section 170 being aligned with each other, such that the outer circumferential surface 204 of the small-diameter section 198 engages the inner circumferential surface 178 of the hollow head section 174. With the closing member 164 being positioned with respect to the cylindrical body section 170 in the radial direction by the engagement of the inner circumferential surface 178 of the cylindrical body section 170 and the outer circumferential surface 204 of the small-diameter section 198 of the closing member 164, the small-diameter section 198 of the closing member 164 is further inserted into the cylindrical body section 170, such that the end face 196 of the large-diameter section 194 is held in abutting contact with the end face 230 of the hollow head section 174 of the cylindrical body section 170. In this state, the end face 230 of the hollow head section 174 and the end face 196 of the large-diameter section 196 of the closing member 164 are bonded to each other by welding upon irradiation of an electron beam emitted from an electron beam emitting device of an electron beam welding apparatus not shown, so that these bonded surfaces provide an interface. The end faces 230, 196 of the hollow head section 174 of the cylindrical body section 170 and the large-diameter section 194 of the closing member 164 at which the cylindrical body section 170 and the closing member 164 are welded together will be hereinafter referred to as "welding surfaces". Described in detail, the two body members 162 and the two closing members 164 fitted in the respective body members 162 are held and sandwiched by and between a pair of jigs not shown such that each closing member 164 is pressed onto the corresponding body member 162 by each jig with the holding portion 212 of each closing member 164 being fitted in a hole formed in the jig. In this state, a torque is applied to each closing member 164 through the jig by a suitable drive device, so that the body members 162 and the closing members 164 are rotated together. With the body members 162 and the closing members 164 being rotated together, the electron beam is incident upon each body member 162 and the corresponding closing member 164 in a direction perpendicular to the axis of the body member 162 (along a straight line parallel to the welding surfaces), so that the spot of the welding beam is moved in the circumferential direction of the blank 160 on a circular welding line along the welding surfaces. Accordingly, portions of the body member 162 and the closing member 164 adjacent to the welding surfaces 230, 196 are fused, for thereby welding the body member 162 to the corresponding closing member 164 at the welding surfaces. The closing members 164 are prevented from being moved away from the respective body members 162 by the jigs which press the closing members 164 onto the body members 162, permitting efficient welding of these members 162, 164. In the present embodiment, the weld nugget, in other words, the depth of fusion or the distance of penetration across the interface between the welding surfaces as measured in the direction of the incidence of the electron beam, reaches the radially inner end of the annular end face 230 of the cylindrical body section 170, as shown in FIG. 5B.

In the present embodiment, the rotation of the blank 160 permits the spot of the electron beam to be moved in the circumferential direction of the blank 160. Alternatively, the electron beam emitting device or the spot of the electron beam may be rotated while the blank 160 is kept stationary.

Each body member 162 and each closing member 164 may be fixed together by laser welding other than the electron beam welding which is a kind of a beam welding.

After two closing members 164 are fixedly fitted in the open end portions of the respective body members 162 as described above, a machining operation is performed on the outer circumferential surfaces of the cylindrical body sections 170 which give the head portions 72 of the two pistons 14, respectively, and the exposed outer circumferential surfaces of the closing members 164. This machining operation is effected on a lathe or turning machine such that the blank 160 is held by chucks at the holding portions 212 of the closing members 164, with the blank 160 being centered with two centers engaging the center holes 234 (each of which is indicated by a two-dot chain line in FIG. 4) of the holding portions 212, and such that the blank 160 (i.e., an assembly of the two body members 162 and the two closing members 164) is rotated by a suitable rotary drive device through the chucks.

Then, the outer circumferential surfaces of the cylindrical body sections 170 of the body members 162 and the closing members 164 are coated with a suitable material, such as a film of polytetrafluoroethylene. The blank 160 is then subjected to a machining operation to cut off the holding portions 212 from the outer end faces 210 of the closing members 164, and a centerless grinding operation on the coated outer circumferential surfaces of the cylindrical body sections 170 and the closing members 164, so that the two portions which provide the head portions 72 of the two pistons 14 are formed. In the next step, a cutting operation is performed near the bridge portions 182 of each engaging section 166, to form the recesses 114 (indicated by a two-dot chain line in FIG. 4) in which the shoes 76 of the piston 14 are received. Thus, the two portions which provide the engaging portions 70 of the two pistons 14 are formed. Finally, the blank 160 is cut into two pieces which provide the respective two single-headed pistons 14.

As is apparent from the above description, the large-diameter portion 136 and the large-diameter section 194 serve as the cylindrical portions of the cap 122, while the small-diameter portion 140 and the small-diameter section 198 serve as the fitting portions of the cap 122. The body 125 of the piston 14 which include the hollow cylindrical body member 120 as a first cylindrical portion and the engaging portion 70, and each body member 162 of the blank 160, which body member 162 includes the hollow cylindrical body section 170 as a first cylindrical portion and the engaging section 166, serve as the hollow cylindrical body members. The cap 122 and the closing member 164 serve as second cylindrical portions. In the present embodiment, the cap 122 and the closing member 164 have female corner portions which are defined by the end faces 138, 196 as a shoulder surface, and the outer circumferential surfaces 148, 204 as a circumferential surface, while the open end portions of the cylindrical body member 120 and the cylindrical body section 170 which include the end faces 152, 230, respectively, provide male corner portions corresponding to the female corner portions. The end faces 138, 196 as the shoulder surfaces of the female corner portions also function as abutting surfaces which are to be held in abutting contact with the end faces 152, 230, respectively.

In the present embodiment, owing to the annular groove 220 formed at a position of the outer circumferential surface 204 of the small-diameter section 198, which position is adjacent to the end face 196 (as the shoulder surface) of the large-diameter section 194, the radially inner end of the open end portion of the cylindrical body section 170 is prevented from interfering with the boundary between the end face 196 of the large-diameter section 194 and the outer circumferential surface 204 of the small-diameter section 198 of the closing member 164. According to this arrangement, the end face 196 of the closing member 164 and the end face 230 of the cylindrical body section 170 can be held in abutting contact with each other without any gap formed therebetween, so that the cylindrical body section 170 and the closing member 164 are fixedly welded together at the welding surfaces 196, 230. The present arrangement is free from the recess or hole conventionally formed in the welded portions due to excessive fusion of the material to fill the gap, for thereby assuring required weld strength between the welding surfaces so as to increase the durability of the piston 14. The female corner portion of the closing member 164, which is defined by the end face 196 and the outer circumferential surface 204, is located relatively distant from a portion of the piston 14 in which stress concentration takes place when the bottom portion 134 of the piston 14 undergoes a three-dimensional elastic deformation due to the pressure and inertia force of the refrigerant gas acting thereon in the compression and suction strokes of the piston 14. The female corner portion of the closing member 164, however, more or less receives a stress concentration. Accordingly, if the depth of welding in the radial direction of the welding surfaces did not reach the radially inner ends of the end faces 196, 230, the end faces which are not welded together would suffer from cracks, and accordingly, the welded portions would be damaged. In the present embodiment, however, the depth of welding reaches the radially inner ends of the end faces 196, 230, for thereby assuring a sufficiently high degree of weld strength between the welding surfaces 196, 230, since the welding surfaces 196, 230 are free from cracks and have a sufficiently large area of contact.

Figure 6:
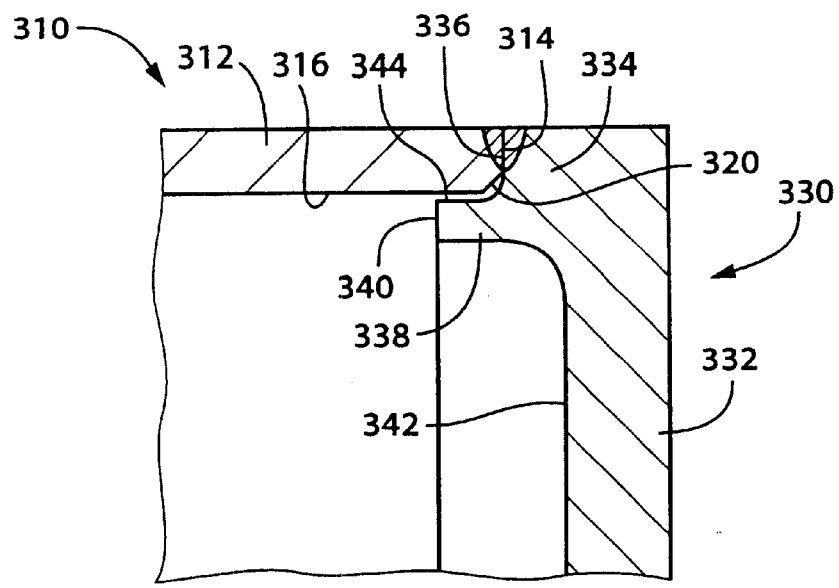
FIG. 6 is a fragmentary front elevational view in cross section of a piston produced according to a second embodiment of the present invention.

In place of forming the annular groove in the female corner portion of the closure member, an edge-free part in the form of a chamfer or a round may be formed in the male corner portion of the hollow cylindrical body member, as shown in a piston shown in FIG. 6, which piston is produced according to a second embodiment of the present invention. In this second embodiment, only the components which are different from those in the first embodiment will be described. As shown in FIG. 6, a hollow cylindrical body member 310 is formed with a chamfer 320 at a radially inner end of an end face 314 of a hollow head portion 312, which end is adjacent to an inner circumferential surface 316 of the hollow head portion 312. The end face 314 of the hollow head portion 312 constitutes the male corner portion. The chamfer 320 is formed by a machining operation after the cylindrical body member 310 has been formed by casting or forging as in the first embodiment.

The cylindrical body member 310 is closed at its open end by a closure member in the form of a cap 330. The cap 330 includes a circular bottom plate portion 332, a cylindrical portion 334 which extends from a radially outer portion of the bottom plate portion 332 in the axial direction of the cap 330, and an annular fitting portion 338 which extends from a radially inner portion of an end face 336 of the cylindrical portion 334 in the axial direction. Like the cap 122 in the first embodiment, the cap 330 has a recess 342 which is open in an end face 340 of the fitting portion 338, so that the weight of the cap 330 is reduced. Like the cylindrical body member 310, the cap 330 is formed by casting or forging. The cap 330 is fitted at its fitting portion 338 in the open end of the hollow head portion 312 in the axial direction, such that an outer circumferential surface 344 of the fitting portion 338 engages the inner circumferential surface 316 of the hollow head portion 312, and such that an end face 336 of the cylindrical portion 334 of the cap 330 is held in abutting contact with the end face 314 of the hollow head portion 312. The clearance between the inner circumferential surface 316 and the outer circumferential surface 344 is exaggerated in FIG. 6. As in the first embodiment, the cylindrical body member 310 and the cap 330 are bonded together by beam welding at the end faces 314, 336 which function as welding surfaces.

The present arrangement wherein the chamfer 320 is formed in the hollow head portion 312, is effective to avoid interference between the open end portion of the hollow head portion 312 and the fillet formed at the boundary between the end face 336 of the cylindrical portion 334 of the cap 330 and the outer circumferential surface 344 of the fitting portion 338 of the cap 330. As described above with respect to the first embodiment, the cap 330 is fixed to the cylindrical body member 310 with a sufficiently high bonding strength since the end faces 336, 314 are welded together while they are held in abutting contact with each other without any gap formed therebetween.

Figure 7:
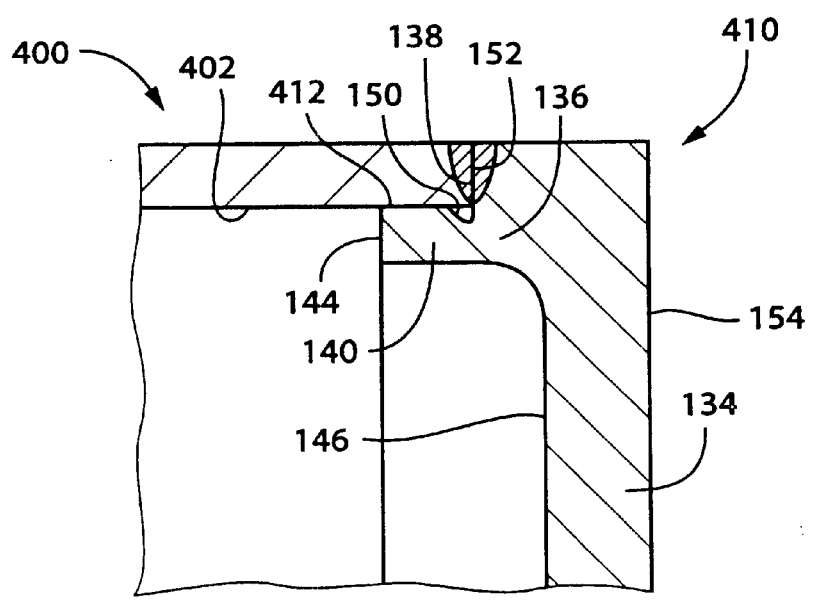
FIG. 7 is a fragmentary front elevational view in cross section of a piston produced according to a third embodiment of the present invention.

In the illustrated embodiments of FIGS. 1–6, the cap 122, 330 and the hollow cylindrical body member 120, 310 are fixed together with a clearance left between the outer circumferential surface 148 of the small-diameter portion 140 of the cap 122 and the inner circumferential surface 128 of the hollow head portion 126, and between the outer circumferential surface 344 of the fitting portion 338 of the cap 330 and the inner circumferential surface 316 of the hollow head portion 312. The cap may be fixed otherwise to the hollow cylindrical body member, as shown in a third embodiment of FIG. 7. In FIG. 7, a cap 410 has a small-diameter portion 140 whose outer circumferential surface 412 has a diameter slightly larger than a diameter of an inner circumferential surface 402 of a hollow cylindrical body member 400, so that the cap 410 is press-fitted at the outer circumferential surface 412 of the small-diameter portion 140 into the inner circumferential surface 402 of the hollow cylindrical body member 400, with an interference fit. In the present embodiment of FIG. 7, the same reference numerals are used to identify the same components as those in the above-described first embodiment of FIGS. 1–5, and a detailed description of which is dispensed with. The present arrangement is effective to increase the bonding strength with which the cap 410 and the hollow cylindrical body member 400 are fixed together while preventing rotary movement of the cap 410 relative to the cylindrical body member 400, and axial movement of the cap 410 away from the cylindrical body member 400, for thereby assuring the concentricity of the cap 410 with respect to the cylindrical body member 400. In the present embodiment, the cylindrical body member 400 and the cap 410 are fixed together by beam-welding the end faces 152, 138 which are held in abutting contact with each other.

The cylindrical body member 400 and the cap 410 may be fixed together other than by the beam welding. For instance, these members may be bonded together with an adhesive agent, as shown in a fourth and a fifth embodiment of FIGS. 8 and 9, respectively. In the fourth and fifth embodiments of FIGS. 8 and 9, only components which are different from those in the above-described first embodiment of FIGS. 1–5 will be explained.

Figure 8:
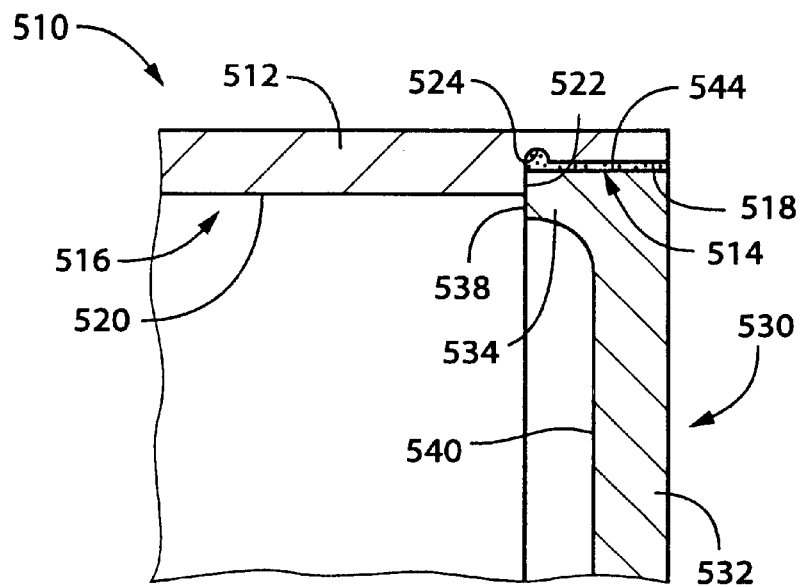
FIG. 8 is a fragmentary front elevational view in cross section of a piston produced according to a fourth embodiment of the present invention.

As shown in FIG. 8, a hollow cylindrical body member 510 includes a hollow head portion 512 whose inner circumferential surface is divided into two portions, i.e., a large-diameter portion 514 on the side of the open end of the hollow head portion 512, and a small-diameter portion 516 remote from the open end. A shoulder surface 522 is formed between the large- and small-diameter portions 514, 516. An annular groove 524 is formed at a position of an inner circumferential surface 518 of the large-diameter portion 514, which position is adjacent to the shoulder surface 522. A cap 530 as a closure member which closes the open end of the cylindrical body member 510, has a circular bottom plate portion 532, and a cylindrical portion 534 which extends from a radially outer portion of the bottom plate portion 534 in the axial direction of the cap 530. The cap 530 has a recess 540 which is defined by the inner circumferential surface of the cylindrical portion 534 and the inner surface of the bottom plate portion 532, and which is open in an end face 538 of the cylindrical portion 534, so that the weight of the cap 530 is reduced.

The cap 530 is inserted into the open end of the cylindrical body member 510 such that the end face 538 of the cylindrical portion 534 of the cap 530 is held in abutting contact with the shoulder surface 522 of the hollow head portion 512. The cylindrical body member 510 and the cap 530 are bonded together by an adhesive agent which is applied between the inner circumferential surface 518 of the large-diameter portion 514 of the cylindrical body member 510 and an outer circumferential surface 544 of the cylindrical portion 534 of the cap 530, and between the shoulder surface 522 of the hollow head portion 512 of the cylindrical body member 510 and the end face 538 of the cylindrical portion 534 of the cap 530. The clearance between the inner and outer circumferential surfaces 518, 544, and the cylindrical wall thickness of the hollow head portion 512 are exaggerated in FIG. 8. Described in detail, prior to the engagement of the cap 530 with the cylindrical body member 510, the adhesive agent is applied to the end face 538 and the outer circumferential surface 544 of the cylindrical portion 534 of the cap 530. The cap 530 is subsequently inserted into the open end of the cylindrical body member 510 while it is positioned concentrically with respect to the cylindrical body member 510. The adhesive agent is cured with the end face 538 and the shoulder surface 522 being held in abutting contact with each other, so that the cap 530 and the cylindrical body member 510 are fixedly bonded together. The radial dimension of the end face 538 as the abutting surface is made larger than that of the shoulder surface 522, so that the radially inner end of the end face 538 is not positioned radially outwardly of the radially inner end of the shoulder surface 522 even if the cap 530 is slightly moved within the large-diameter portion 514 of the hollow head portion 512 in the radially outward direction. In other words, the inside diameter of the cylindrical portion 534 of the cap 530 is made smaller than that of the small-diameter portion 516 of the cylindrical body member 510.

The adhesive agent may be applied to the inner circumferential surface 518 and the shoulder surface 522 of the hollow head portion 512, in place of or in addition to, the end face 538 and the outer circumferential surface 544 of the cap 530.

As the adhesive agent, a cold-setting adhesive agent such as methacrylate, acrylate or acryl, and a thermosetting adhesive agent such as epoxy, polyimide, polyamideimide, or phenol are used, for instance. Further, cold-setting, two-liquid type adhesive agent such as acryl may be employed.

In the present embodiment, too, the annular groove 524 is effective to avoid a gap which would be otherwise formed between the end face 538 of the cap 530 and the shoulder surface 522 of the hollow head portion 512 of the cylindrical body member 510, so that the thickness of the adhesive layer formed therebetween is kept at a value suitable for satisfying a required bonding strength at the bonding surfaces. Where the present arrangement wherein two pairs of contacting surfaces, i.e., the end face 538 and the shoulder surface 522, and the inner and outer circumferential surfaces 518, 544, are bonded together, is capable of assuring a further improved bonding strength at the bonding surfaces. Only one pair of contacting surfaces may be bonded together.

Figure 9:
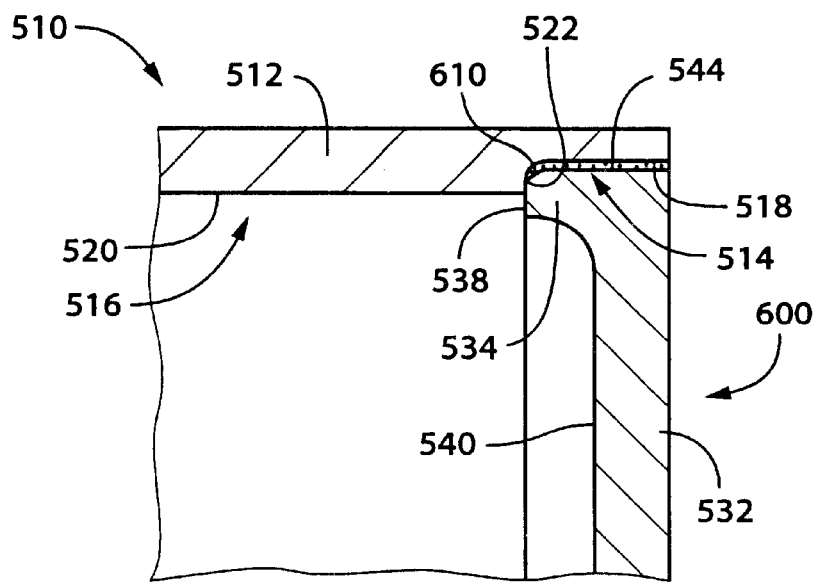
FIG. 9 is a fragmentary front elevational view in cross section of a piston produced according to a fifth embodiment of the present invention.

In place of forming the annular groove 524 shown in the embodiment of FIG. 8, a chamfer may be formed. FIG. 9 shows a fifth embodiment wherein a chamfer 610 as one example of the edge-free part is formed at a radially outer end of the end face 538 of the cylindrical portion 534 of a cap 600. This fifth embodiment provides the same effect as described above with respect to the fourth embodiment of FIG. 8.

In the embodiments of FIGS. 8 and 9, the caps 530, 600 may be press-fitted at at least a portion of its outer circumferential surface 544 into the inner circumferential surface of the cylindrical body member 510, with an interference fit. For example, the diameter of an axial portion of the outer circumferential surface 544 of the cap 530 which is relatively nearer and adjacent to the bottom plate portion 532 is made larger than the diameter of the inner circumferential surface 518 of the large-diameter portion 514 of the hollow head portion 512 of the cylindrical body member 510, so that the above-indicated axial portion is press-fitted in the inner circumferential surface 518. In this case, the diameter of an axial portion of the outer circumferential surface 544 which is remote from the bottom plate portion 532 is made slightly smaller than the diameter of the inner circumferential surface 518 of the large-diameter portion 514. It is preferable to apply the adhesive agent to the reduced-diameter axial portion of the outer circumferential surface 544, and between the end face 538 and the shoulder surface 522, for bonding the cylindrical body member 510 and the cap 530, 600 together.

Alternatively, the cylindrical body member 510 and the cap 530, 600 may be fixed together by beam-welding the inner and outer circumferential surfaces 518, 544 to each other.

In place of the beam welding effected in the embodiments of FIGS. 1–5, FIG. 6, and FIG. 7, the cylindrical body member 120, 310, 400 and the cap 122, 330, 410 may be fixed together by bonding, as in the embodiments of FIGS. 8 and 9, by application of the adhesive agent to at least one of the two pairs of contacting surfaces, i.e., the end face 152, 314 of the hollow head portion 126, 312, 413 and the end face 138, 336 of the cap 122, 330, 410, and the inner circumferential surface 128, 316, 402 of the hollow head portion 126, 312, 413 and the outer circumferential surface 148, 344, 412 of the cap 122, 330, 410.

Figure 10:
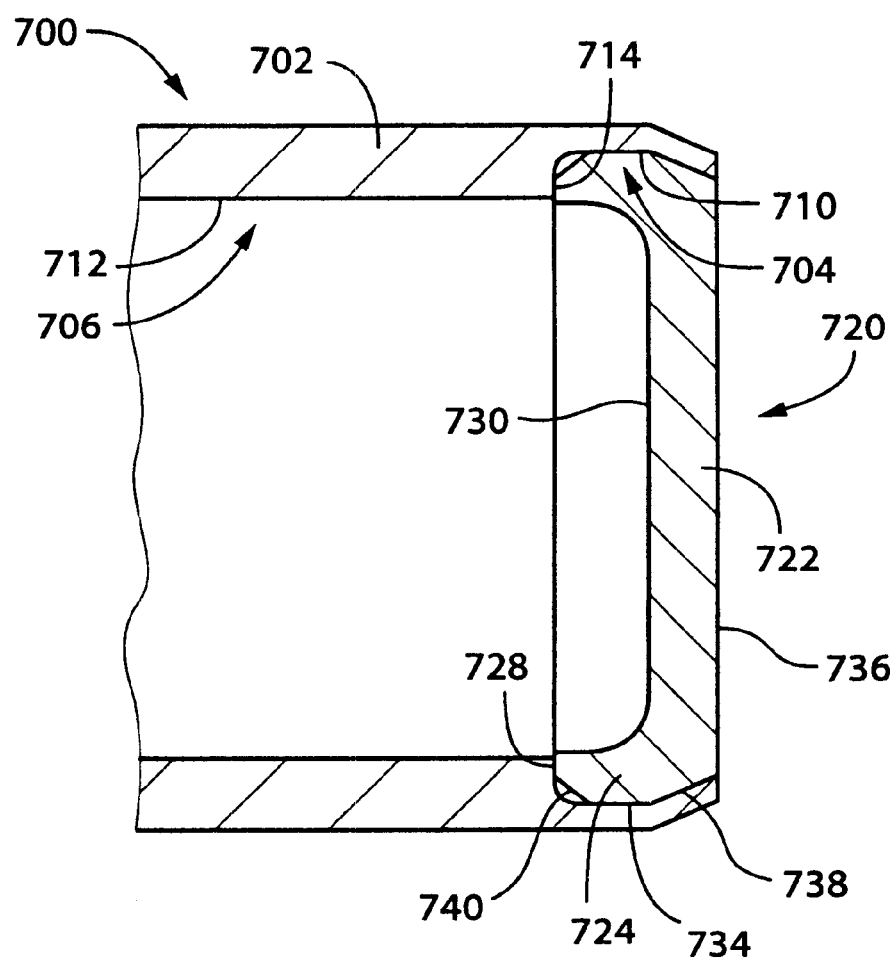
FIG. 10 is a fragmentary elevational view in cross section of a piston produced according to a sixth embodiment of the present invention.

The hollow cylindrical body member and the cap may be fixed together by caulking. FIG. 10 shows a sixth embodiment wherein a cylindrical body member 700 and a cap 720 are fixed together by caulking. Described in detail, the cylindrical body member 700 includes a hollow head portion 702 whose inner circumferential surface is divided into two portions, i.e., a large-diameter portion 704 on the side of its open end, and a small-diameter portion 706 remote from the open end. A shoulder surface 714 is formed between an inner circumferential surface 710 of the large-diameter portion 704 and an inner circumferential surface 712 of the small-diameter portion 706. The cap 720 as the closure member for closing the open end of the cylindrical body member 700 includes a circular bottom plate portion 722, and a cylindrical portion 724 which extends from a radially outer portion of the bottom plate portion 722 in the axial direction of the cap 720. The cap 720 has a recess 730 which is defined by an inner circumferential surface of the cylindrical portion 724 and an inner surface of the bottom plate portion 722 and which is open in an end face 728 of the cylindrical portion 724, so that the weight of the cap 720 is reduced. A fillet is formed at a boundary between the inner circumferential surface of the cylindrical portion 724 and the inner surface of the bottom plate portion 722 (i.e., bottom surface of the recess 730). The cap 720 has an outer circumferential surface which consists of a straight portion 734 having a diameter that permits the straight portion 734 to be engaged with the inner circumferential surface 710 of the large-diameter portion 704 of the cylindrical body member 700, and a tapered portion 738 extending from one of opposite ends of the straight portion 734 which is remote from the end face 728 of the cylindrical portion 724 of the cap 720 and having a diameter which gradually decreases in an axial direction of the cap 720 from the end face 728 toward an outer end face 736 of the cap 720. A chamfer 740 is formed at a radially outer end of the straight portion 734 of the cap 720, which end is adjacent to the end face 728.

The cap 720 is fixed to the cylindrical body member 700 such that the outer circumferential surface of the cap 720 engages at its straight portion 734 the inner circumferential surface 710 of the large-diameter portion 704 of the cylindrical body member 700, and such that the end face 728 of the cylindrical portion 724 of the cap 720 is held in abutting contact with the shoulder surface 714 of the cylindrical body member 700. With the cap 720 being positioned relative to the large-diameter portion 704 of the cylindrical body member 700, the open end portion of the cylindrical body member 700 is caulked radially inwardly against the tapered portion 738 of the cap 720, whereby the caulked portion of the cylindrical body member 700 is held in pressing contact with the tapered portion 738, so that the cylindrical body member 700 and the cap 720 are fixed together while preventing the cap 720 from moving away from the hollow head portion 702 of the cylindrical body member 700. In the present embodiment, the cylindrical body member 700 and the cap 720 are fixed together by caulking without any gap formed between the shoulder surface 714 and the end face 728, so that the cap 720 is inhibited from rattling relative to the cylindrical body member 700, for thereby assuring a high degree of bonding strength between the cylindrical body member 700 and the cap 720, resulting in increased operating reliability of the piston.

Prior to insertion of the cap 720 into the cylindrical body member 700, the adhesive agent may be applied to at least one of the end face 728 of the cap 720 and the shoulder surface 714 of the cylindrical body member 700. After the adhesive agent which has been applied between the end face 728 and the shoulder surface 714 that are held in abutting contact with each other is cured, the open end portion of the cylindrical body member 700 is caulked radially inwardly against the tapered portion 738 of the cap 720, for thereby fixing the cylindrical body member 700 and the cap 720 together with a high degree of bonding strength and with high stability. In addition to the end face 728 and the shoulder surface 714, the straight portion 734 of the cap 720 and the corresponding inner circumferential surface 710 of the large-diameter portion 704 of the hollow head portion 702 may be bonded to each other. The same adhesive agents as described above with respect to the embodiment of FIG. 8 are used in this embodiment.

Figure 11:
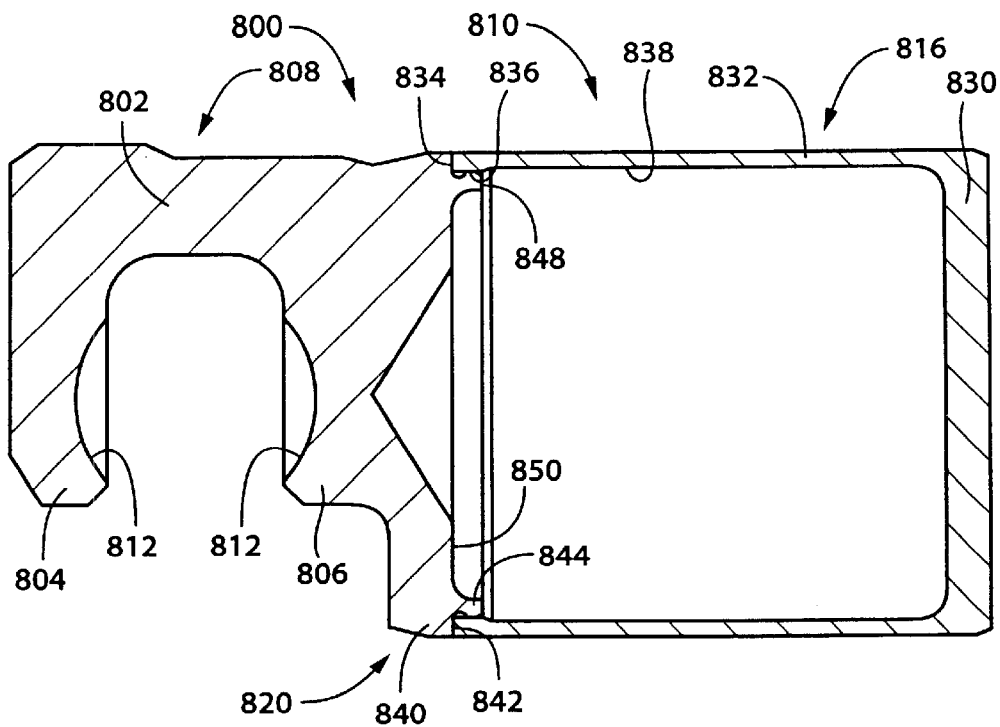
FIG. 11 is a front elevational view in cross section of a piston produced according to a seventh embodiment of the present invention.
Figure 12:
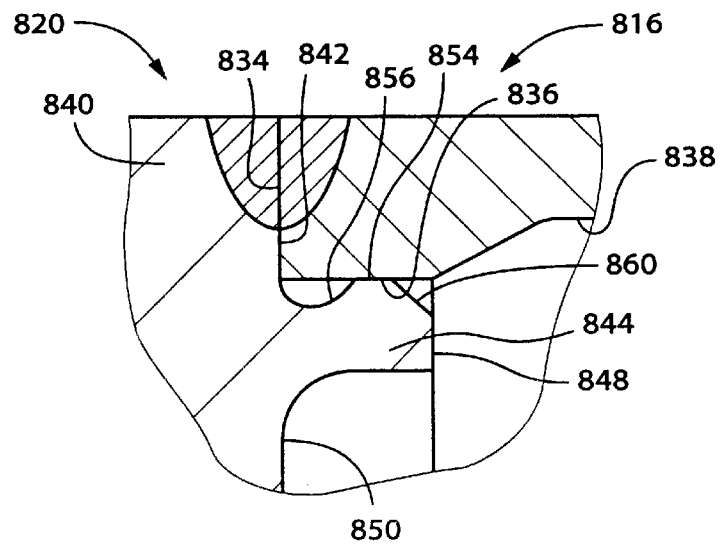
FIG. 12 is a fragmentary enlarged front elevational view of the piston of FIG. 11.

The structure of the piston is not limited to those described in the first through sixth embodiments. FIGS. 11 and 12 show a single-headed piston 800 produced according to a seventh embodiment of the present invention. The piston 800 includes an engaging portion 808, and a head portion 810 which is slidably fitted in a cylinder bore 12 of the compressor. Like the engaging portion 70 of the piston 14 in the first embodiment, which engages the swash plate 60, the engaging portion 808 has a generally U-shape in cross section. Described in detail, the engaging portion 808 has a base section 802 which defines the bottom of the U-shape and a pair of substantially parallel arm sections 804, 806 which extend from the base section 802 in a direction perpendicular to the axis of the piston 800. The two opposed lateral walls of the U-shape of the engaging portion 808 have respective recesses 812, 812 which are opposed to each other. Each of these recesses 812 is defined by a part-spherical inner surface of the lateral wall. A pair of shoes are received in the respective part-spherical recesses 812.

The head portion 810 of the piston 800 includes a cylindrical body member 816 which is closed at one of its opposite ends, and a generally circular closing portion 820 which closes the open end of the cylindrical body member 816. The closing portion 820 is formed integrally with the engaging portion 808 and functions as a closure member. The engaging portion 808 and the closing portion 820 are formed by forging or casting of a metallic material in the form of an aluminum alloy. The cylindrical body member 816 includes a circular bottom portion 830, and a hollow head portion 832 which extends from a radially outer portion of the bottom portion 830 in the axial direction of the cylindrical body member 816. As shown in the enlarged view of FIG. 12, the diameter of the inner circumferential surface 836 of the hollow head portion 832 on the side of its end face 834 is made smaller than that of the inner circumferential surface 838 of the hollow head portion 832 remote from the end face 834. In other words, the cylindrical wall thickness of the hollow head portion 832 is made smaller except for its open end portion, so that the weight of the hollow head portion 832 is reduced. Further, the end face 834 has a relatively large radial dimension and functions as an annular abutting surface. The cylindrical body member 816 is also formed by casting or forging of an aluminum alloy, and is produced separately from the closure member including the engaging portion 808 and the closing portion 820. The inner circumferential surface of the cylindrical body member 816 is subjected to a machining operation to reduce its cylindrical wall thickness except for its open end portion.

The closing portion 820 includes a bottom portion 840 whose outside diameter is substantially equal to that of the cylindrical body member 816, and a hollow cylindrical portion 844 which extends from an end face 842 of the bottom portion 840 in the axial direction of the closing portion 820. The closing portion 820 has a recess 850 which is defined by the inner circumferential surface of the cylindrical portion 844 and the inner surface of the bottom portion 840, and which is open in an end face 848 of the cylindrical portion 844, so that the weight of the closing portion 820 is reduced.

As clearly shown in FIG. 12, an annular groove 856 is formed at a position of an outer circumferential surface 854 of the cylindrical portion 844 of the closing portion 820, which position is adjacent to the end face 842. A chamfer 860 is formed at a radially outer end of the end face 848, which end is adjacent to the outer circumferential surface 854 of the cylindrical portion 844. The chamfer 860 functions as guiding means for guiding the cylindrical portion 844 of the closing portion 820 into the cylindrical body member 816.

With the cylindrical body member 816 being positioned concentrically with respect to the closing portion 820, the closing portion 820 and the cylindrical body member 816 are assembled together, such that the outer circumferential surface 854 of the cylindrical portion 844 of the closing portion 820 is fitted onto the inner circumferential surface 836 of the hollow head portion 832, and such that the end face 842 of the closing portion 820 is held in abutting contact with the end face 834 of the hollow head portion 832 of the cylindrical body member 816. The closing portion 820 and the cylindrical body member 816 are fixed together by a welding beam such as an electron beam whose spot is moved in the circumferential direction, so that the end faces 834, 842 are welded together.

In place of the annular groove 856, an edge-free part in the form of a chamfer may be formed at a radially inner end of the end face 834 of the cylindrical body member 816, which end is adjacent to the inner circumferential surface 836 of the hollow head portion 832, as in the embodiment of FIG. 6. In the present embodiment, the cylindrical body member 816 and the closing portion 820 are fixed together, such that the inner circumferential surface 836 of the hollow head portion 832 and the outer circumferential surface 854 of the cylindrical portion 844 of the closing portion 820 are held in engagement with each other with a clearance left therebetween. Alternatively, the closing portion 820 may be press-fitted at the outer circumferential surface 854 of its cylindrical portion 844 into the inner circumferential surface 836 of the hollow head portion 832 of the cylindrical body member 816, with an interference fit. Further, the end faces 842, 834 and/or the inner and outer circumferential surfaces 836, 854 may be bonded together with an adhesive agent.

The cylindrical body member and the closure member (e.g., the cap and the closing portion) may be fixed together by any suitable means other than the above-described beam welding, press-fitting, bonding and caulking. For instance, the closure member is fixed to the cylindrical body member by bonding, using an alloy having a lower melting point than those members, such as a soldering or brazing material. Further, the closure member may be fixed to the cylindrical body member by means of screws. Alternatively, the closure member may be fixed to the body member by utilizing frictional contact or plastic material flow between the two members. There methods may be used in combination.

At least one of the cylindrical body member and the closure member may be formed of other metallic material such as a magnesium alloy. When the body member and the closure member are fixed together by bonding and caulking, the closure member may be formed of a resin material suitable for bonding and caulking.

When the closure member has a simple circular configuration, the closure member may be produced by effecting a machining operation on an ordinary cylindrical member which is commercially available.

In the illustrated embodiments, two pieces of the single-headed piston can be produced from a single blank. However, a single piston may be produced from a blank which includes one body member and one closing member.

For reducing the weight of the closure member, it is preferable to form the recess therein. However, the formation of the recess is not essential.

The construction of the swash plate type compressor for which the pistons 14, 800 according to the present invention are incorporated is not limited to that of FIG. 1. For instance, the capacity control valve 90 is not essential, and the compressor may use a shut-off valve which is mechanically opened and closed depending upon a difference between the pressures in the crank chamber 86 and the discharge chamber 24. In place of or in addition to the capacity control valve 90, a solenoid-operated control valve similar to the capacity control valve 90 may be provided in the bleeding passage 100. Alternatively, a shut-off valve may be provided, which is mechanically opened or closed depending upon a difference between the pressures in the crank chamber 86 and the suction chamber 22.

The principle of the present invention is applicable to a double-headed piston having two head portions on the opposite sides of the engaging portion which engages the swash plate. The pistons in the illustrated embodiments may be used in a swash plate type compressor of fixed capacity type wherein the inclination angle of the swash plate is fixed.

Figure 13:
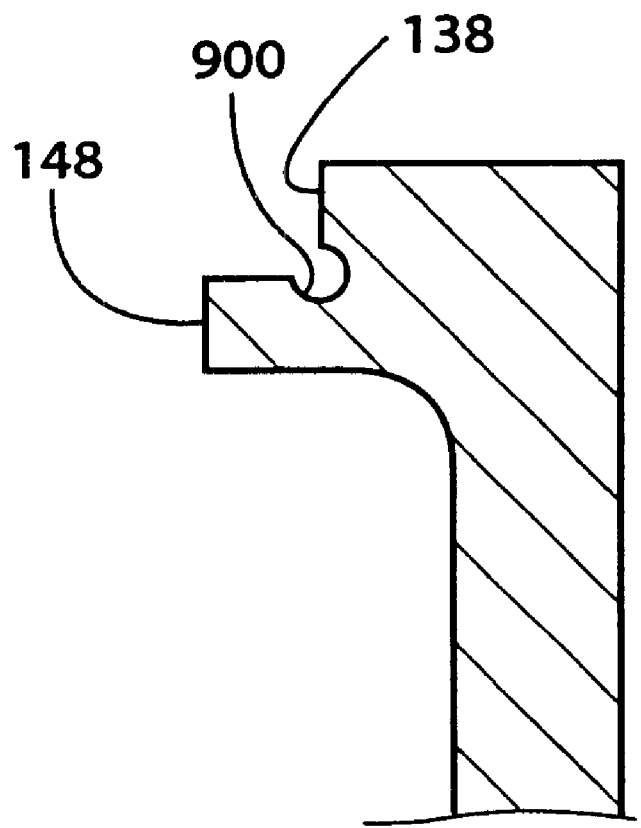
FIG. 13 is an elevational view showing a groove according to another embodiment of the present invention.

In the illustrated embodiments, the annular groove of the female corner portion may be formed in the mutually adjacent ends of the shoulder surface and the circumferential surface, as shown in FIG. 13.

While the presently preferred embodiments of this invention have been described above, for illustrative purpose only, it is to be understood that the present invention may be embodied with various changes and improvements such as those described in the SUMMARY OF THE INVENTION, which may occur to those skilled in the art.

What is claimed is:

1. A method of producing a hollow piston for a compressor including a head portion which is slidably fitted in a cylinder bore of the compressor, and an engaging portion which engages a reciprocating drive device of the compressor which reciprocates the piston, at least said head portion of the piston being hollow, said method comprising the steps of:

forming a hollow cylindrical body member which has an open end at at least one of opposite ends thereof, and a closure member which closes said open end of said cylindrical body member, one of said cylindrical body member and said closure member having an annular shoulder surface and a circumferential surface which is adjacent to said annular shoulder surface, said annular shoulder surface and said circumferential surface cooperating with each other to define a female corner portion, the other of said cylindrical body member and said closure member having a male corner portion which corresponds to said female corner portion; and fixing said cylindrical body member and said closure member to each other, so that said male corner portion engages said female corner portion, and wherein said step of forming said cylindrical body member and said closure member comprises at least one of (a) a step of forming an annular groove at a position of one of said annular shoulder surface and said circumferential surface of said female corner portion, said position being adjacent to the other of said annular shoulder surface and said circumferential surface, and (b) a step of forming an edge-free part in said male corner portion.

2. A method according to claim 1, wherein said circumferential surface partially defining said female corner portion is an inner circumferential surface.

3. A method according to claim 1, wherein said circumferential surface partially defining said female corner portion is an outer circumferential surface.

4. A method according to claim 1, wherein said hollow cylindrical body member includes a bottom portion and a hollow head portion, said engaging portion being formed integrally with said bottom portion of said cylindrical body member.

5. A method according to claim 4, wherein said closure member is a generally circular plate member.

6. A method according to claim 4, wherein said closure member includes a circular bottom plate portion and a cylindrical portion, said closure member, which is fixed to said cylindrical body member functioning as a first cylindrical portion of the piston, functioning as a second cylindrical portion of the piston, said first cylindrical portion and said second cylindrical portion being fixed together at their distal ends.

7. A method according to claim 1, wherein said cylindrical body member includes a bottom portion and a hollow head portion, while said closure member includes a generally circular closure portion and said engaging portion which is formed integrally with said circular closure portion.

8. A method according to claim 1, wherein said step of fixing said cylindrical body member and said closure member to each other comprises a step of beam-welding at least one of said annular shoulder surface and said circumferential surface of said female corner portion, to a surface of said male corner portion, which surface corresponds to said at least one of said annular shoulder surface and said circumferential surface.

9. A method according to claim 1, wherein said step of fixing said cylindrical body member and said closure member to each other comprises a step of bonding, by using an adhesive agent, at least one of said annular shoulder surface and said circumferential surface of said female corner portion to a surface of said male corner portion, which surface corresponds to said at least one of said annular shoulder surface and said circumferential surface.

10. A method according to claim 1, wherein said circumferential surface partially defining said female corner portion is an inner circumferential surface, and wherein said step of fixing said cylindrical body member and said closure member to each other comprises a step of caulking radially inwardly a cylindrical wall which has said inner circumferential surface of said female corner portion.

11. A method of producing a hollow piston for a compressor including a head portion which is slidably fitted in a cylinder bore of the compressor, and an engaging portion which engages a reciprocating drive device of the compressor which reciprocates the piston, at least said head portion of the piston being hollow, said method comprising the steps of:

forming a cylindrical body member which has an open end at at least one of opposite ends thereof, and a closure member which has an annular abutting surface that is to be held in abutting contact with an end face of said cylindrical body member on the side of said open end thereof, and an annular protruding fitting portion which axially protrudes from said annular abutting surface and which is inserted into said open end of said cylindrical body member; and fixing said closure member to said cylindrical body member such that said annular protruding fitting portion of said closure member being inserted into said open end of said cylindrical member, and such that said annular abutting surface of said closure member is held in abutting contact with said end face of said cylindrical body member, and wherein said step of forming said cylindrical body member and said closure member comprises at least one of (a) a step of forming an edge-free part at a radially inner end of said end face of said cylindrical body member, and (b) a step of forming an annular groove at a position of one of an outer circumferential surface and said annular abutting surface of said closure member, said position being adjacent to the other of said outer circumferential surface and said annular abutting surface.

12. A method of producing a hollow piston for a compressor including a head portion which is slidably fitted in a cylinder bore of the compressor, and an engaging portion which engages a reciprocating drive device of the compressor which reciprocates the piston, at least said head portion of the piston being hollow, said method comprising the steps of:

forming a cylindrical body member which has an open end at at least one of opposite ends thereof and which includes a large-diameter portion on the side of said open end, a small-diameter portion remote from said open end, and a shoulder surface between said large-diameter and small-diameter portions, and a closure member which has an annular abutting surface that is to be held in abutting contact with said shoulder surface; and fixing said closure member to said cylindrical body member such that said closure member is inserted into said large-diameter portion of said cylindrical body member with said annular abutting surface of said closure member being held in abutting contact with said shoulder surface of said cylindrical body member, and wherein said step of forming said cylindrical body member and said closure member comprises at least one of (a) a step of forming an annular groove at a position of one of an inner circumferential surface and said shoulder surface, said position being adjacent to the other of said inner circumferential surface and said shoulder surface, and (b) a step of forming an edge-free part at a radially outer end of said annular abutting surface of said closure member.

* * * * *